United States Patent [19]

Davidov

[11] Patent Number: 4,652,924
[45] Date of Patent: Mar. 24, 1987

[54] RF VOLUME CONTROL CIRCUIT

[75] Inventor: Mircho A. Davidov, San Diego, Calif.

[73] Assignee: Oak Industries Inc., Rancho Bernardo, Calif.

[21] Appl. No.: 679,696

[22] Filed: Dec. 10, 1984

[51] Int. Cl.$^4$ .............................................. H04N 5/62
[52] U.S. Cl. .................................... 358/197; 358/198; 358/194.1
[58] Field of Search ............. 358/197, 196, 198, 194.1

[56] References Cited

U.S. PATENT DOCUMENTS

| | | | |
|---|---|---|---|
| 4,158,858 | 6/1979 | Janssen | 358/198 X |
| 4,237,485 | 12/1980 | Saito et al. | 358/198 X |
| 4,536,798 | 8/1985 | Reid, Jr. et al. | 358/197 |

Primary Examiner—Michael A. Masinick
Assistant Examiner—E. Anne Toth
Attorney, Agent, or Firm—Kinzer, Plyer, Dorn & McEachran

[57] ABSTRACT

A TV remote volume control includes an RF input for receiving the video modulated RF carrier and the audio modulated RF carrier, both with common mode spurious deviation. The audio modulated RF carrier is demodulated to provide a baseband audio signal without common mode spurious deviation. The video modulated RF carrier is used to provide a video RF carrier signal with common mode spurious deviation. The baseband audio is volume controlled and the volume controlled baseband audio is then used to provide an audio modulated IF carrier. The volume controlled audio modulated IF carrier is combined with the video carrier with common mode spurious deviation to provide a volume controlled audio modulated RF carrier with common mode spurious deviation.

5 Claims, 1 Drawing Figure

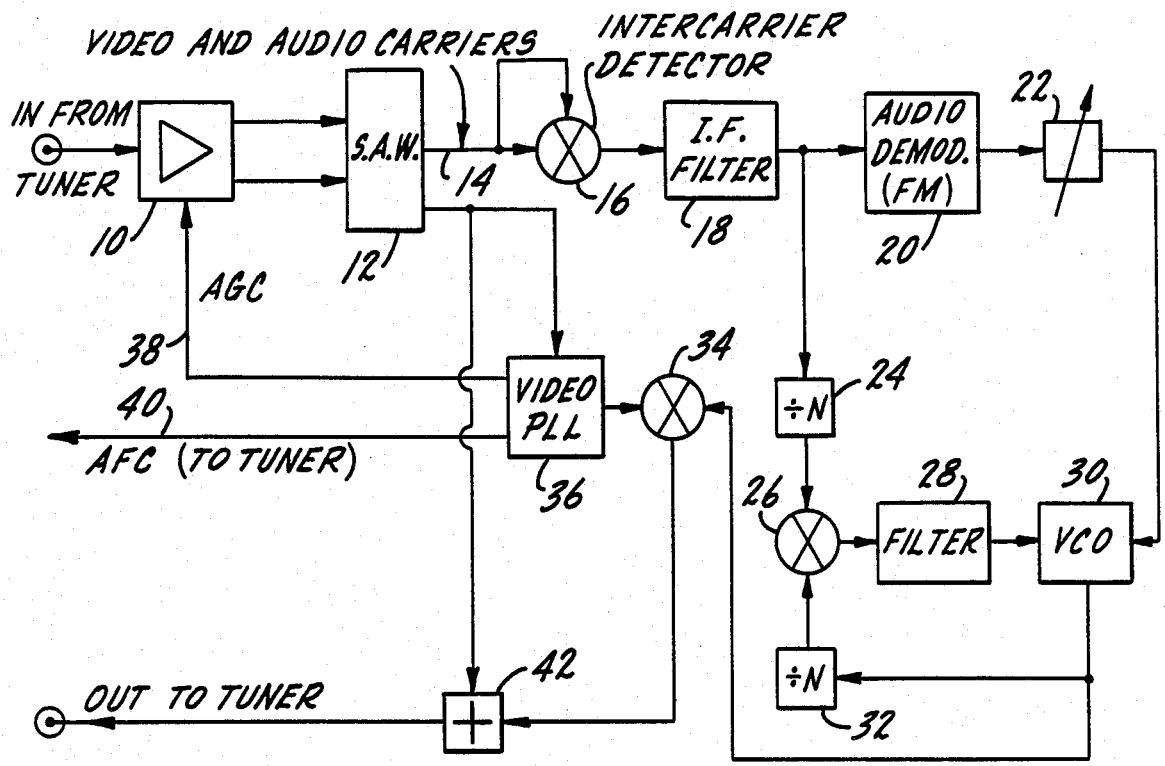

RF VOLUME CONTROL CIRCUIT

SUMMARY OF THE INVENTION

The present invention relates to volume control circuits having particular utility in cable television, over-the-air pay television or satellite television converters. A primary purpose is a remote volume control circuit for the use described which maintains common mode deviation on the audio modulated carrier.

Another purpose is a remote volume control circuit for the use described which utilizes the common mode spurious deviation on the video carrier to insure that the volume controlled audio signal maintains the same level of common mode spurious deviation.

Other purposes will appear in the ensuing specification, drawing and claims.

BRIEF DESCRIPTION OF THE DRAWING

The invention is illustrated diagrammatically in the following drawing of one embodiment of a RF volume control circuit for use with unscrambled television signals.

DESCRIPTION OF THE PREFERRED EMBODIMENT

The present invention has utility as a volume control for cable television converters and for over-the-air or satellite pay television converters. The principles herein will be described in that environment, although the volume control circuit described may have other applications.

An RF FM sound signal may be volume controlled by means of a conventional demodulation/remodulation circuit or by a frequency modulation feedback loop. In a demod/remod volume control, the RF FM sound signal is first demodulated, after which a remotely operated device modifies the amplitude of the demodulated signal. The modified demodulated sound signal is then applied to an FM remodulator whose deviation will then vary in accordance with the remotely controlled amplitude of the demodulated sound television signal. This technique is routinely used in television sets to remotely control the sound volume or loudness.

A frequency modulated feedback loop provides frequency deviation or compression and/or expansion, and therefore volume control, by varying the deviation of a voltage controlled oscillator (VCO) and the IF carrier in a frequency tracking loop. This may be advantageous in that it eliminates one or more electronic stages when compared with the conventional demod/remod technique. A feedback loop also permits the elimination of the effect of deviation control on common mode spurious deviation, which is commonly referred to as power hum, without demodulating the video carrier in the process. This technique is described in copending application Ser. No. 601,595 filed Apr. 18, 1984 and assigned to the assignee of this application.

In a conventional television set, the power hum or common mode spurious deviation is normally removed by multiplication of the audio and video signals. However, if the spurious deviations in these FM signals are not the same, the multiplication technique will not eliminate the common mode spurious deviation. In a baseband set top converter, the spurious signals are eliminated by first demodulating the sound carrier in an intercarrier detector, demodulating the video with a phase insensitive amplitude detector and then remodulating the spurious signal free audio and video signals for display in a TV set.

The present invention uses the demod/remod technique and volume controls the audio signal at baseband frequency. Common mode spurious deviation is maintained at the appropriate level for subsequent elimination in an intercarrier detector on the TV set by using the video carrier common mode spurious deviation and applying it to the volume controlled audio signal.

In the drawing, an RF input 10 receives the video modulated RF carrier and the audio modulated RF carrier from the cable television converter, assuming that application. In the RF input 10, the audio and video RF carrier signals receive automatic gain control and amplification. The output from input 10 is connected to a surface acoustic wave (SAW) filter 12. There are two outputs from SAW filter 12. One output, on line 14, includes the video and audio modulated RF carriers, each with common mode spurious deviation, which are connected to an intercarrier detector 16. Detector 16 multiplies the video and audio RF carriers with the resultant being an intermediate frequency carrier signal modulated by the audio and without common mode spurious deviation which was removed in the intercarrier detector. The output from detector 16 is connected to IF filter 18. Since the output from the detector will include multiplication products other than the desired IF frequency of 4.5 MHz, the IF filter is required.

Connected to the output of IF filter 18 is an audio FM demodulator 20 which receives as its input an audio modulated IF carrier and provides at its output baseband audio. The output from demodulator 20 is connected to a remote volume control circuit 22 which will amplitude modulate the baseband audio signal to provide a sound level desired by the viewer.

A second output from IF filter 18 is a divide circuit 24 which will divide the 4.5 MHz signal down to a suitable reference frequency with the output of the divide circuit being connected to a mixer 26. Mixer 26 is connected to a filter 28 with the resultant reference frequency being connected to a voltage controlled oscillator (VCO) 30. The deviation control signal for VCO 30 is provided by the volume controlled baseband audio signal from remote volume control 22. In order to maintain the nominal frequency of VCO 30 at the proper IF level, the output from the VCO is connected to a second divide circuit 32 which provides the other input for mixer 26. Thus, the combination of the two divide circuits, mixer 26 and filter 28 are effective to lock VCO 30 at a 4.5 MHz IF signal.

The output from VCO 30 is a 4.5 MHz IF signal, audio modulated and without common mode spurious deviation. This signal is connected to a mixer 34.

A second output from SAW filter 12 is the video modulated RF carrier, but with the audio carrier suppressed by 45–60 db. This signal is connected to a video phase lock loop 36. There are several outputs from phase lock loop circuit 36. One provides the automatic gain control for RF input 10 along line 38. Another output will provide an automatic frequency control on line 40 to the tuner of the cable television converter. A third output from phase lock loop 36 is the video carrier with common mode spurious deviation, but without the video modulation. This signal is connected to mixer 34. The output from mixer 34 will be an audio modulated carrier signal, at the appropriate RF frequency and with common mode spurious deviation which has not been effected by the volume control applied to the audio signal. The output from mixer 34 is connected to a combining circuit 42 which receives as a second input the video modulated RF carrier with common mode spurious deviation from SAW filter 12. The output from combiner 42 which will be a volume controlled audio RF carrier with common mode spurious deviation and the video modulated RF carrier, again with common mode spurious deviation, will be provided to the tuner in the cable television converter.

Common mode spurious deviation is maintained on both the video modulated and audio modulated carriers and it is maintained at the same level, even though the audio portion of the composite signal is volume controlled. This is essential so that the common mode deviation or power hum may be subsequently removed by the intercarrier detector in the television set.

The invention is particularly advantageous in that it maintains the appropriate level of common mode spurious deviation provides a means for volume controlling the audio signal, but without the numerous electronic stages normally utilized in circuits of this general description.

Whereas the preferred form of the invention has been shown and described herein, it should be realized that there may be many modifications, substitutions and alterations thereto.

The embodiments of the invention in which an exclusive property or privilege is claimed are defined as follows:

1. A TV remote volume control including an RF input for receiving a video modulated RF carrier and an audio modulated RF carrier, both with common mode spurious deviation, filter means connected thereto and providing a first output of the video modulated RF carrier and suppressed audio modulated RF carrier and a second output of the video and audio modulated RF carriers, an intercarrier detector connected to said second output from said filter means and an IF filter connected to said intercarrier detector, with the output from said IF filter being an audio modulated IF carrier, an FM audio demodulator connected to said IF filter and a volume control circuit connected to said FM audio demodulator to control the amplitude of the audio signal, circuit means connected to said first output of said filter means and providing the video RF carrier with common mode spurious deviation, an IF voltage controlled oscillator (VCO), the output of said volume control providing a deviation control for said VCO, a mixer, one input for said mixer being provided by the video RF carrier with common mode spurious deviation, the other input being provided by said VCO and being an audio modulated IF carrier without common mode spurious deviation, the output from said mixer being an audio modulated RF carrier with common mode spurious deviation.

2. The volume control circuit of claim 1 further characterized in that an IF signal for said IF VCO is provided by said IF filter, and means for locking the frequency of said IF VCO.

3. The TV remote volume control circuit of claim 1 further characterized in that the circuit means connected to said filter means for providing the video RF carrier with common mode spurious deviation includes a video phase lock loop, with one output from said phase lock loop being the video RF carrier modulated by common mode spurious deviation.

4. The remote volume control of claim 3 further characterized in that said RF input includes an amplifier, with said video phase lock loop providing an automatic gain control signal for said amplifier.

5. A TV remote volume control including an RF input for receiving the video modulated RF carrier and the audio modulated RF carrier, both with common mode spurious deviation, means connected to said input for demodulating the audio modulated RF carrier and providing a baseband audio signal without common mode spurious deviation, means connected to said demodulating means for controlling the volume of said baseband audio signal, means connected to said input for providing a video RF carrier signal with common mode spurious deviation, means for using the volume controlled baseband audio signal to provide an audio modulated IF carrier, means for mixing the audio modulated IF carrier and the video RF carrier with common mode spurious deviation to provide a volume controlled audio modulated RF carrier with common mode spurious deviation, and means for combining the volume controlled audio modulated RF carrier with common mode spurious deviation and the video modulated RF carrier with common mode spurious deviation.

* * * * *